April 8, 1930. H. A. BODGE ET AL 1,753,914
BAKE OVEN
Filed Jan. 9, 1928
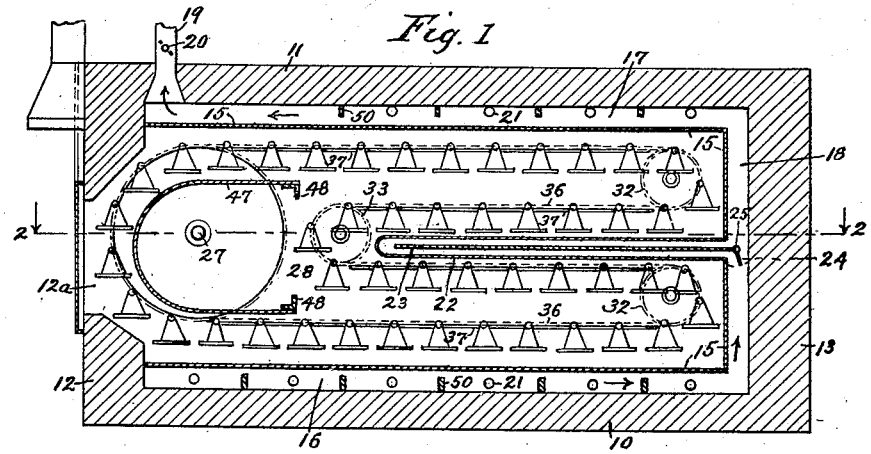
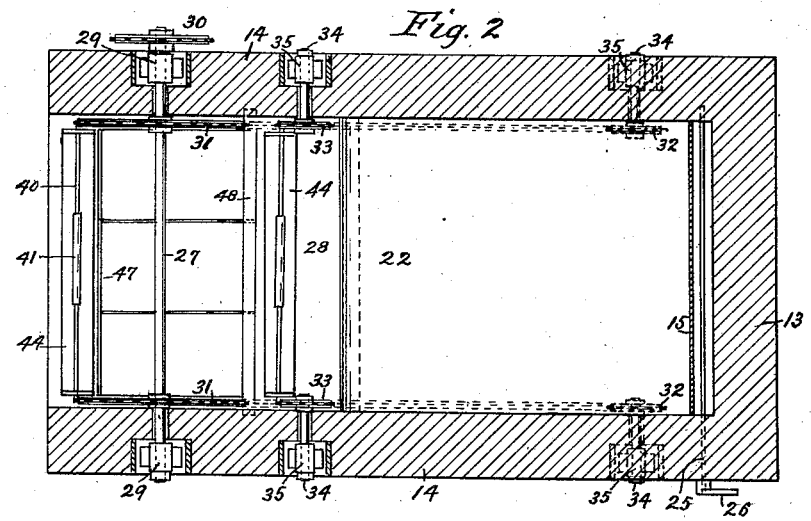
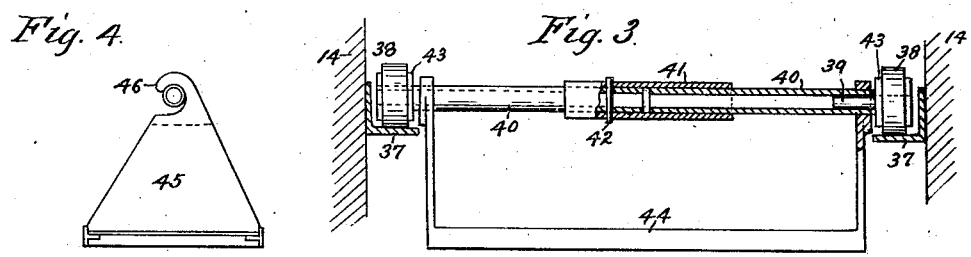
INVENTORS.
Horace A. Bodge
BY Joseph C. Emley
Wm Bodge ATTORNEY.

Patented Apr. 8, 1930

1,753,914

UNITED STATES PATENT OFFICE

HORACE A. BODGE, OF WHITE PLAINS, NEW YORK, AND JOSEPH C. EMLEY, OF MELROSE PARK, PENNSYLVANIA

BAKE OVEN

Application filed January 9, 1928. Serial No. 245,414.

The present invention relates to improvements in bake ovens of a class in which a series of trays are suspended on a continuously movable endless carrier, and arranged to receive and deliver respectively the unbaked and baked loaves in a continuous manner through a common door opening in the front wall of the oven.

The objects of the invention include means for arrangeing the carrier in a series of superposed horizontal runs with respect to the front feed and delivery in order to substantially fill the baking chamber, and thus to limit the size of the latter for the required travel of the work.

A further object is to provide indirect heating means arranged to readily control and distribute the heat as may be required to the several sections of the baking chamber and carrier trays.

Also the objects include means for detachably connecting certain portions of the carrier to afford increased facilities for assembling and replacing the parts thereof.

For further comprehension of the invention, and of the objects and advantages thereof, reference is had to the following description and accompanying drawing, and to the appended claims in which the various features of the invention are more particularly set forth.

Figure 1 of the drawing is a longitudinal sectional elevation of the bake oven embodying the present invention. Figure 2 is a sectional plan view taken along the broken line 2—2 of Fig. 1. Figure 3 is a detail longitudinal view of one of the carrier trays, showing supporting means therefor. Fig. 4 is an end view of the tray. Fig. 5 shows a cross sectional view of the corrugated partitions forming the walls of the baking chamber.

Numerals 10 and 11 indicate respectively the main bottom and top walls of the oven, 12 and 13 the respective front and back walls, and 14 the side walls. From the bottom, top and back main walls are spaced the partition plates or walls 15, forming with said main walls the horizontal heating chambers or flues 16 and 17 and the vertical heating flue 18, the several heating chambers communicating with each other to form a continuous flue provided at its upper end with an outlet flue 19 having a damper or valve 20, by means of which the flow of heat within the flues may be controlled.

The heating chambers or flues 16 and 17 are provided with heating elements indicated by 21, and may consist either of electrical heaters or of gas burners arranged to be connected up in the usual manner. Also communicating with the vertical heating chamber 18 and extending horizontally inward therefrom is a return flue heating chamber 22 having a closed inner end and provided with an interior partition plate 23 disposed therein in spaced relation to the walls thereof to form a double flue extending on opposite sides of the plate and leading from and returning to the vertical chamber 18, and at which latter junction the plate is provided with a damper 24, hingedly supported by a rod 25, extending at one end through a side wall 14 and provided with a terminal handle 26. By means of the handle the damper 24 may be turned and adjustably positioned with respect to the walls of the vertical heating chamber 18 to direct more or less of the heated column of air through the return flue heating chamber 22, the heated air being confined within the several heating chambers by the close engagement of the flue plates with the main side walls of the oven.

The front wall 12 of the oven is provided with a door opening 12$^a$, and disposed adjacent thereto is a driving shaft 27 extending transversely of the baking chamber 28 and rotatively mounted at its opposite ends in the wall boxes 29 of the side walls 14, a driving wheel 30 being fixed to the outer end of said driving shaft. Fixed to the shaft 27, interiorly adjacent the side walls 14 are a pair of drive wheels 31, and alined therewith are a series of guide wheels 32 and 33 fixed upon the inner ends of stub-shafts 34, the latter being carried by wall boxes 35 mounted in the side walls 14. The drive wheels 31 operatively engage a pair of endless carrier-chains 36 which extend therefrom in substantially horizontal lines and pass in looped relation around the guide wheels 32 and 33, support for the carrier-chains between the wheels being provided by the angle-iron bars 37 fixed to the opposite inner faces of the side walls of the oven, and engaged in the usual manner by shoes or movable rollers 38 connected in spaced relation along the carrier-chains.

The opposite rollers 38, as indicated in Fig. 3, are transversely alined with respect to each other by means of their journal-pins 39, which project inwardly from the rollers and slidingly engage the bore of a two-part tubular shaft 40, the latter being separable midway the length thereof. A tubular coupling sleeve 41 is slidable over the two-part shaft and is fixedly secured to one of said parts by a taper pin 42. By removing the pin the sleeve may be entirely transferred to one of said shaft sections and in which position both parts of the tubular shaft may be readily removed from the journal-pins 39 of the rollers 38, the journal-pins extending through the link connections 43 of the carrier-chain 36. Upon the removal of the tubular cross shaft 40 the adjacent roller and chain connections are free to be removed, adjusted or reassembled.

As indicated in Fig. 3, the trays 44 are detachably suspended from the cross shaft 40, the side members 45 of the trays having at their upper ends the hook members 46, as shown in Fig. 4. As thus suspended, the trays in their path of travel over the relatively large diameter wheels 31 at the front end of the carrier substantially cover the interior of the door opening and thus serve to largely prevent the escape of heat from the baking chamber. As an additional prevention a sectional baffle-plate 47 is disposed adjacent to and within the path of the carrier at the front end thereof, the plate being supported by transverse angle-bars 48, fixed at their opposite ends to the side walls 14 of the oven. As thus connected the sectional baffle plate may be readily inserted or detached upon the removal of one or more of trays 44 and tubular hanger shafts 40, and thus provide an entrance through the door opening 12ª into the baking chamber for convenience of repairs or adjustment of the parts therein, vertically movable doors being provided and mounted in the usual manner to adjustably close the door opening.

In the operation of the oven, the pans containing the material to be baked are manually passed through the door opening and placed upon the slowly moving carrier-trays which are conveyed by the continuously moving carrier chains in substantially horizontal lines forwardly and backwardly in looped relation through the baking chamber, returning the trays after the baking process to the door opening where the pans containing the baked material are manually removed from the trays and new ones added during the continuous movement of the carrier. In the looped forward and backward movement of the carrier-chains, the trays thereon are closely spaced apart in height with respect to each other and with the horizontal heating chamber 22 afford only the necessary working clearances, as provided by the mounting of the guide wheels 32 and 33, fixed upon the free inner ends of the stub shafts 34, thus limiting in height the interior dimensions of the oven for a definite length of travel of the work. By this compact arrangement the heating effect within the baking chamber becomes more concentrated and the baking action obtained with correspondingly less amount of heat, the latter being more effectively distributed with respect to the walls of the baking chamber by the baffles 50 disposed in spaced relation within the heating flues 16 and 17, the interior walls thereof being preferably provided with corrugated sectional plates shown in detail sectional view, Fig. 5, to provide increased radiating surface for this purpose.

We claim:

1. In a bake oven, the combination with a carrier provided with a series of detachable trays, a pair of tracks fixedly supported within said oven, oppositely disposed bearing members movable along said tracks, two-part hanger-bars connecting said opposite bearing members together and disposed to receive said trays, and means for detachably securing the sections of the hanger-bars together.

2. In a bake oven, a tray carrier, a pair of tracks fixedly supported within said oven, oppositely disposed bearing members movable along said tracks, a two-part hanger-bar comprising tubular shafts connecting said opposite bearing members together, a coupling sleeve slidable over said tubular shafts, and a coupling pin detachably securing said coupling sleeve to one of said tubular shafts.

3. In a bake oven, a tray carrier, a pair of tracks fixedly supported within said oven, oppositely disposed bearing members movable along said tracks, a two-part hanger-bar comprising tubular shafts connecting said opposite bearing members together, a coupling sleeve slidable over said tubular shafts, a coupling pin detachably securing said coupling sleeve to one of said tubular shafts, journal pins slidable within the outer ends of said tubular shafts, and rollers carried on said journal pins.

Signed at New York, in the county of New York and State of New York this 14th day of December, A. D. 1927.

HORACE A. BODGE.
JOSEPH C. EMLEY.